United States Patent
Campbell et al.

(10) Patent No.: US 7,001,679 B2
(45) Date of Patent: *Feb. 21, 2006

(54) PROTECTIVE OVERLAYER FOR CERAMICS

(75) Inventors: Christian X. Campbell, Orlando, FL (US); Jay E. Lane, Murrysville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/214,785

(22) Filed: Aug. 8, 2002

(65) Prior Publication Data

US 2003/0035907 A1 Feb. 20, 2003

Related U.S. Application Data

(60) Provisional application No. 60/311,185, filed on Aug. 9, 2001.

(51) Int. Cl.
*B32B 9/00* (2006.01)
*C04B 35/51* (2006.01)

(52) U.S. Cl. ............... 428/698; 428/312.2; 428/312.8; 428/699; 428/702; 428/704; 501/152

(58) Field of Classification Search ............. 428/319.1, 428/698, 702, 699, 701, 312.2, 312.8, 704; 501/152
See application file for complete search history.

(56) References Cited

U.S. PATENT DOCUMENTS

| | | | | |
|---|---|---|---|---|
| 5,038,693 A | * | 8/1991 | Kourtides et al. | 112/440 |
| 5,380,580 A | * | 1/1995 | Rogers et al. | 428/219 |
| 5,391,404 A | | 2/1995 | Lee et al. | |
| 5,514,474 A | | 5/1996 | Morgan et al. | |
| 5,665,463 A | | 9/1997 | Morgan et al. | |
| 5,759,632 A | | 6/1998 | Boakye et al. | |
| 5,858,465 A | | 1/1999 | Hunt et al. | |
| 5,948,516 A | | 9/1999 | Kriven et al. | |
| 5,985,470 A | | 11/1999 | Spitsberg et al. | |
| 6,013,592 A | | 1/2000 | Merrill et al. | |
| 6,036,762 A | | 3/2000 | Sambasivan | |
| 6,074,699 A | * | 6/2000 | Dichiara et al. | 427/344 |
| 6,733,907 B1 | * | 5/2004 | Morrison et al. | 428/699 |
| 2002/0189496 A1 | * | 12/2002 | Davis et al. | |

* cited by examiner

*Primary Examiner*—Hai Vo

(57) ABSTRACT

A xenotime phosphate protective overlayer (22) for protecting a ceramic material (24) from a high temperature, moisture-containing environment. Yttrium phosphate may be used as a protective overlayer to protect an underlying mullite layer to temperatures in excess of 1,500° C. The coating may have porosity of greater than 15% for improved thermal shock protection. To prevent the ingress of oxygen to an underlying ceramic non-oxide material, such as silicon carbide or silicon nitride, an oxygen barrier layer (34) is disposed between the xenotime phosphate coating and the non-oxide material. Such a protective overlayer may be used for an article having a ceramic matrix composite substrate.

14 Claims, 1 Drawing Sheet

PROTECTIVE OVERLAYER FOR CERAMICS

This application claims benefit of the Aug. 9, 2001, filing date of U.S. provisional patent application Ser. No. 60/311,185.

FIELD OF THE INVENTION

This invention relates generally to the field of materials, and more specifically to the field of ceramics, and in particular, to a protective overlayer coating for a ceramic matrix composite component of a gas turbine engine.

BACKGROUND OF THE INVENTION

Components of gas turbine engines are exposed to very high temperature, high pressure combustion gasses containing moisture, oxygen and other corrosive compounds. Modern gas turbine engines may have firing temperatures that exceed 1,400° C., and temperatures of 1,500–1,600° C. are expected as the demand for even more efficient engines continues. Cobalt and nickel base superalloys are used to form many gas turbine components, but even these superalloy materials must be aggressively cooled and/or insulated from the hot gas flow in order to survive long term operation in the combustion environment.

Ceramic matrix composite (CMC) materials have many potential applications in high temperature environments due to their ability to withstand and operate at temperatures in excess of those allowed for a non-insulated superalloy part. However, CMC's can survive temperatures in excess of 1,200° C. for only limited time periods in a combustion environment. Furthermore, oxide-based CMC's can not be cooled effectively with active cooling systems due to their low thermal conductivity and their limitations in cooling fluid path design due to manufacturing constraints. Non-oxide based CMCs can be aggressively cooled to withstand temperatures above 1200° C., but they are subject to environmental degradation that limits their useful life. To increase the operating temperature range and useful life for CMC materials, a high temperature insulation for a ceramic matrix composite material is described in U.S. Pat. No. 6,013,592.

Current structural ceramic technology for gas turbine engines relies on silica-based materials. Silica-based non-oxides such as silicon carbide (SiC) and silicon nitride ($Si_3N_4$) are subject to both oxidation and attack by high temperature, high pressure water vapor. In this dual degradation mechanism, the silicon carbide or silicon nitride is oxidized to form a thermally grown oxide ($SiO_2$) layer. This oxide layer then reacts with the high temperature, high pressure water vapor to form a volatile hydroxide species [$Si(OH)_x$] which is then lost to the environment. Thus, surface recession occurs in a continual process as the protective $SiO_2$ layer volatizes and the base ceramic oxidizes to replenish the lost $SiO_2$. This process is enhanced by the high velocity gas stream in a gas turbine environment. Accordingly, environmental barrier coatings (EBC) have been developed to protect silica-based non-oxide ceramics from the combustion environment. U.S. Pat. No. 5,391,404 describes a process for coating a silica-based ceramic with mullite, and U.S. Pat. No. 5,985,470 describes a barium strontium aluminosilicate (BSAS) bond coat underlying a thermally insulating top coat over a silicon carbide containing substrate. These EBC's typically function at a maximum surface temperature of 1,200–1,300° C. Since growth of a silicon dioxide layer underneath the environmental barrier coating could result in spalling of the coating and loss of environmental protection, the environmental barrier coating material must be sufficiently dense to prevent the ingress of oxygen through the coating, for example having only closed porosity of no more than approximately 10%.

The composite structure described in U.S. Pat. No. 6,013,592 utilizes a thick mullite-based thermal barrier coating over a ceramic matrix composite substrate material. Oxide ceramics such as mullite ($3Al_2O_3$–$2SiO_2$) are not subject to oxidation, but they are degraded by the effects of high temperature water vapor, albeit at a slower rate than non-oxide ceramics. The rate of silica loss and subsequent recession of an oxide ceramic material will increase with an increasing temperature and flow velocity, and mullite may not perform adequately in certain gas turbine applications where flow rates are high and temperatures may be in the range of 1,500–1,600° C.

SUMMARY OF THE INVENTION

Accordingly, improved materials are needed for use in advanced combustion turbine engines where firing temperatures may be in the range of 1,500–1,600° C.

An article is described herein as including: a non-oxide ceramic substrate; an oxygen barrier layer disposed on the non-oxide ceramic substrate; and a xenotime phosphate compound disposed on the oxygen barrier layer. The xenotime phosphate compound may be yttrium phosphate. The non-oxide ceramic substrate may be one of the group of silicon carbide and silicon nitride; and the oxygen barrier layer may be one of the group of mullite, zircon, zirconium phosphate, and yttrium silicate. The xenotime phosphate compound may have a porosity of at least 10% or at least 15%, and a thickness of greater than 0.1 mm. The non-oxide ceramic substrate may include silicon.

In another embodiment, an article is described as including an ceramic oxide substrate; and a xenotime phosphate compound disposed on the ceramic oxide substrate. The xenotime phosphate compound may be yttrium phosphate, and the ceramic oxide may be mullite. The ceramic oxide substrate may be one of the group of alumina, mullite, yttrium aluminum garnet and zirconia. The xenotime phosphate compound may have a porosity of at least 10%. or at least 15%, and a thickness of greater than 0.1 mm. The ceramic oxide substrate may include silicon.

An article is also described as having a ceramic matrix composite substrate; a layer of ceramic oxide insulating material disposed on the substrate; and a layer of a xenotime phosphate compound disposed on the layer of insulating material. The xenotime phosphate compound may be yttrium phosphate, and the layer of ceramic oxide insulating material may be mullite. The xenotime phosphate compound may have a porosity of at least 10%. or at least 15%, and a thickness of greater than 0.1 mm. The ceramic oxide insulating material may include silicon.

BRIEF DESCRIPTION OF THE DRAWINGS

These and other advantages of the invention will be more apparent from the following description in view of the drawings that include.

DETAILED DESCRIPTION OF THE INVENTION

A xenotime phosphate compound may be used as a protective overlayer coating material for ceramics and ceramic matrix composite materials. Xenotime phosphates include yttrium phosphate ($YPO_4$), erbium phosphate ($ErPO_4$), ytterbium phosphate ($Yb\ PO_4$), and lutetium phosphate ($LuPO_4$). In one particular application, the compound yttrium phosphate ($YPO_4$) may be used as a protective overlayer for mullite and mullite containing ceramics. Yttrium phosphate is a stable compound up to its melting point, and it is chemically compatible with many different oxides up to 1,600° C., including mullite, alumina, yttrium aluminum garnet (YAG) and zirconia ($ZrO_2$). It is known that yttrium phosphate exhibits certain physical properties that are quite similar to mullite. Yttrium phosphate has been considered as an alternative for mullite in certain applications. These physical similarities make yttrium phosphate compatible as a coating for mullite, as shown in the following table:

|  | Mullite | Yttrium Phosphate |
| --- | --- | --- |
| Elastic Modulus (GPa) | 150 | 152 |
| Coefficient of Thermal Expansion (RT to 1,000° C.) | 5.3–5.7 | 6.2 |
| Melting Temperature (° C.) | 1,934 | 1,995 |

Each of the xenotime phosphates is a candidate as a protective overlayer for mullite since each has a coefficient of thermal expansion that closely matches that of mullite.

Figure 1:
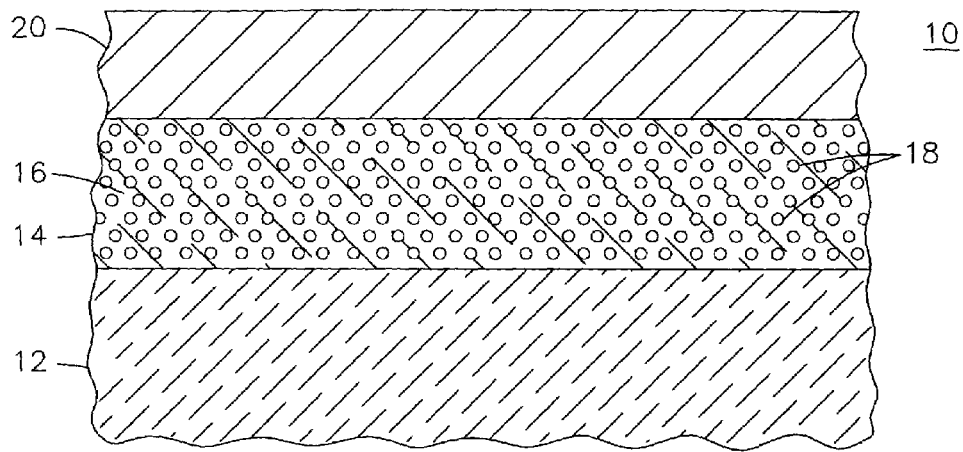
FIG. 1 is a partial cross-sectional view of a component formed of a ceramic matrix composite substrate material covered with a ceramic oxide insulating material, which in turn is protected by a xenotime phosphate coating.

FIG. 1 is a partial cross-sectional view of a component 10 of a gas turbine engine. The component 10 is formed of a substrate 12 of a ceramic matrix composite material that is thermally protected by a ceramic insulating coating 14. The ceramic matrix composite substrate 12 and ceramic insulating coating 14 may be of the type described in U.S. Pat. No. 6,013,592, incorporated by reference herein. Ceramic insulating coating 14 is an oxide based ceramic including a matrix material 16 surrounding a plurality of mullite spheres 18. The matrix material 16 may include a mullite filler powder and a phosphate binder or an alumina filler powder and an alumina binder.

The mullite-based ceramic insulating coating 14 would be susceptible to silica loss and/or recession if it were exposed to very high temperature and atmospheric or high pressure water vapor, such as in the range of 1,500–1,600° C. Accordingly, an protective overlayer 20 is disposed over the ceramic insulating coating 14 to isolate the ceramic insulating coating 14 from water vapor contained in the hot gas environment in which component 10 is designed to operate. The protective overlayer 20 is a xenotime phosphate compound such as yttrium phosphate applied by any known deposition process, such as slurry coating, sol-gel, chemical vapor deposition, physical vapor deposition or plasma spray.

In one test specimen, a layer 20 of yttrium phosphate was applied as a slurry coat and was fired at 1,400° C. The thickness of the coating was relatively uniform at approximately 250 microns. Despite the high firing temperature, the slurry coating showed no evidence of surface cracking, which can be attributed to a good match between the coefficients of thermal expansion of the yttrium phosphate coating 20 and the underlying mullite-based insulation layer 14. Micro-cracking was present within the coating 20, which may give the coating 20 added strain tolerance. There was no evidence of reaction between the mullite and the yttrium phosphate.

An exposure test was conducted on yttrium phosphate coated mullite specimens. The test specimens were pellets having a diameter of about 20 mm having a yttrium phosphate coating of about 1–2 mm. The test environment was limited to atmospheric pressure and a flow rate of 1.5 liter/minute, and was maintained at 100% water vapor in order to maximize the partial pressure of $H_2O$. The test was conducted for 1,000 hours at 1,400° C. Three proprietary sodium zirconium phosphate (NZP) compositions were also tested in this same environment. Each of the NZP specimens showed catastrophic weight loss (>30%), which demonstrates the aggressiveness of the exposure conditions. By contrast, the yttrium phosphate coated mullite specimens showed good resistance to the environment, exhibiting only 1–2% weight loss after 1,000 hours. Additional testing at high flow rates has not been completed.

Figure 2:
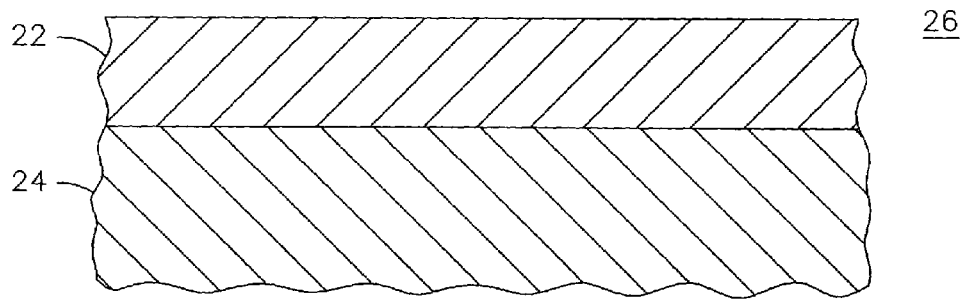
FIG. 2 is a partial cross-sectional view of a refractory oxide ceramic combustor tile formed of a ceramic oxide protected by a layer of yttrium phosphate.

FIG. 2 illustrates a layer of a xenotime phosphate compound 22 such as yttrium phosphate disposed over a ceramic oxide substrate 22 to form a refractory oxide ceramic combustor tile 26. The ceramic oxide substrate 22 may be mullite, zircon, an aluminosilicate or a sodium zirconium phosphate, for example. Layer 22 may be deposited by slurry coating, sol-gel, chemical vapor deposition, physical vapor deposition or plasma spray. Protective overlayer 22 may advantageously be applied to a thickness of greater than 0.1 mm (100 microns), for example, to a thickness of 0.1–0.5 mm, or greater than 0.1 mm up to 0.5 mm, or between 0.15–0.5 mm, or between 0.25–0.5 mm. Such thicknesses are possible because of the close match between the coefficients of thermal expansion between the protective overlayer 22 and the underlying layer 24. Typical prior art environmental barrier coatings may be limited to a thickness of about 0.1 mm due to differential thermal expansion concerns. The protective overlayer 22 may be formed to have a porosity of greater than 10%, or preferably greater than 15%, in order to provide the material with an improved resistance to thermal shock loadings. Such porosity is not problematic in this embodiment since the underlying oxide material is not vulnerable to oxidation attack, and is only vulnerable to high velocity water vapor attack. Furthermore, the thickness of layer 22 of greater than 0.1 mm ensures protection against moisture penetration in spite of such porosity, and it provides additional margin against erosion of the protective overlayer 22. The layer of xenotime phosphate compound 22 acts as a barrier for the underlying ceramic oxide substrate 22 against a high temperature, high flow rate, moisture-bearing operating environment having a temperature exceeding 1,500° C. The layer of xenotime phosphate compound 22 also acts as a barrier for the underlying ceramic oxide substrate 24 in combustion type applications, such as gas turbines, where degradation of the underlying ceramic oxide substrate 24 would be further enhanced by high gas pressures.

Figure 3:
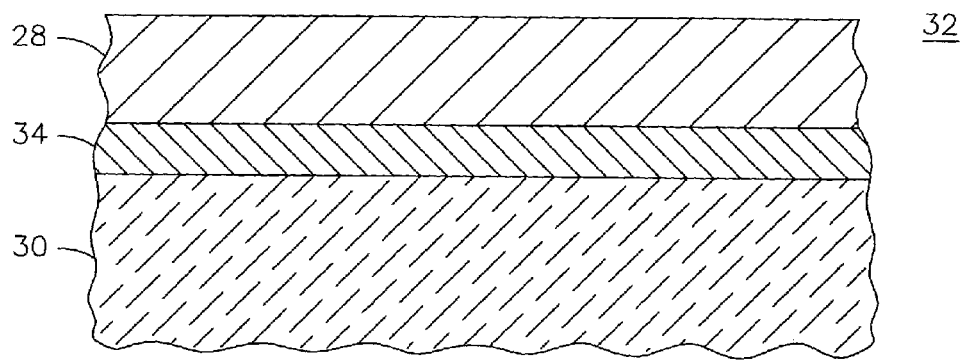
FIG. 3 is a partial cross-sectional view of a non-oxide ceramic substrate material protected by a xenotime phosphate coating, wherein an oxygen barrier layer is disposed between the non-oxide substrate and the protective coating.

FIG. 3 illustrates the use of a layer of yttrium phosphate 28 as a protective overlayer coating for a non-oxide ceramic substrate 30, such as silicon carbide or silicon nitride, to form an article 32. In this embodiment, the substrate 30 may be vulnerable to oxidation attack which could result in spalling of any overlying coating. To prevent such oxidation, an oxygen barrier layer 34 is disposed between the non-oxide ceramic substrate 30 and the moisture barrier yttrium phosphate layer 28. The barrier layer 34 prevents the migration of oxygen from the environment to the underlying oxide layer 30. The barrier layer 34 should be selected to be chemically and physically compatible with layers 28, 30 and may be mullite, zircon ($ZrSiO_4$), zirconium phosphate, or yttrium silicate ($Y_2Si_2O_7$), for example. The barrier layer 34 may be deposited by any of the above-described deposition methods and may have a thickness of 10–100 microns.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An article adapted for use in a combustion environment, the article comprising:
    a non-oxide ceramic substrate;
    an oxygen barrier layer disposed on the non-oxide ceramic substrate; and
    an overlayer of xenotime phosphate compound disposed on the oxygen barrier layer and defining a surface exposed to the combustion environment.

2. The article of claim 1, wherein the xenotime phosphate compound comprises yttrium phosphate.

3. The article of claim 1, further comprising:
    the non-oxide ceramic substrate comprises one of the group of silicon carbide and silicon nitride; and
    the oxygen barrier layer comprises one of the group of mullite, zircon, zirconium phosphate, and yttrium silicate.

4. The article of claim 1, further comprising the overlayer of xenotime phosphate compound having a porosity of at least 10%.

5. The article of claim 1, further comprising the overlayer of xenotime phosphate compound having a porosity of at least 15%.

6. The article of claim 1, wherein the non-oxide ceramic substrate comprises silicon.

7. The article of claim 1, further comprising the overlayer of xenotime phosphate compound having a thickness of greater than 0.1 mm.

8. An article adapted for use in a combustion environment, the article comprising:
    a ceramic matrix composite substrate;
    a layer of ceramic oxide insulating material comprising mullite disposed on the substrate; and
    a layer of a xenotime phosphate compound disposed on the layer of insulating material and defining a surface exposed to the combustion environment.

9. The article of claim 8, wherein the xenotime phosphate compound comprises yttrium phosphate.

10. The article of claim 8, wherein the xenotime phosphate compound comprises yttrium phosphate and the layer of ceramic oxide insulating material comprises mullite.

11. The article of claim 10, further comprising the layer of yttrium phosphate compound having a thickness of greater than 0.1 mm.

12. The article of claim 8, further comprising the xenotime phosphate compound comprising a porosity of at least 10%.

13. The article of claim 8, further comprising the xenotime phosphate compound comprising a porosity of at least 15%.

14. The article of claim 8, wherein the ceramic oxide insulating material comprises silicon.

* * * * *